(12) United States Patent  
Ohta et al.

(10) Patent No.: US 6,470,766 B2
(45) Date of Patent: Oct. 29, 2002

(54) POWER TRANSMISSION SYSTEM FOR WORKING MACHINE

(75) Inventors: Yoshitaka Ohta, Wako (JP); Tomoaki Ishikawa, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 3 days.

(21) Appl. No.: 09/757,410

(22) Filed: Jan. 9, 2001

(65) Prior Publication Data

US 2001/0009078 A1 Jul. 26, 2001

(30) Foreign Application Priority Data

Jan. 17, 2000 (JP) ........................................ 2000-008341
Nov. 7, 2000 (JP) ........................................ 2000-338964

(51) Int. Cl.⁷ .............................. F16H 35/10; F16D 7/02
(52) U.S. Cl. .......................... 74/425; 74/89.14; 74/411
(58) Field of Search ................... 74/89.14, 411, 74/425, 446, 665 GB, 665 GD; 464/30

(56) References Cited

U.S. PATENT DOCUMENTS 2,939,330 A * 6/1960 Margetts ................. 211/1.51
3,321,565 A * 5/1967 Peterson et al. ............ 264/162
3,406,583 A * 10/1968 Baier ........................... 464/23
4,192,195 A * 3/1980 Kazino et al. ................. 464/10
4,813,303 A * 3/1989 Beezer et al. ................. 464/46
6,247,439 B1 * 6/2001 Gokan et al. ............. 123/185.6

FOREIGN PATENT DOCUMENTS

JP 39004607 2/1939
JP 58157029 10/1983
JP 02112715 9/1990

* cited by examiner

Primary Examiner—David A. Bucci
Assistant Examiner—Colby Hansen
(74) Attorney, Agent, or Firm—Adams & Wilks (57) ABSTRACT

A power transmission system for a working machine, wherein drive power is transmitted from an engine to a work-tool holding drive shaft via a reduction mechanism is provided. The reduction mechanism includes an input shaft having a first gear, and an output shaft having a second gear. The second gear has a gear portion and a cylindrical boss segment press fitted thereto, forming a torque limiter. As a result, the reduction mechanism, which has the torque limiter, has a simplified structure, enabling easy assemblage.

19 Claims, 10 Drawing Sheets

POWER TRANSMISSION SYSTEM FOR WORKING MACHINE

BACKGROUND OF THE INVENTION

1. Field of the Invention

This invention relates to power transmission systems for working machines such as a snow removing machine and a power tiller and, more particularly, to an improvement over a torque limiter of such power transmission systems.

2. Description of the Related Art

An auger type snow removing machine is of the type wherein a spiral blade, known as an auger, collects snow and the collected snow is delivered to a blower for discharge. The auger is driven by an engine or electric motor (hereinafter referred to as a prime mover) via a power transmission system. When operating the auger, the auger tends to bite a lump of ice or stones (hereinafter referred to as foreign matters) and the power transmission system suffers from an overload, resulting in damages to the power transmission system. To solve this problem, it has heretofore been proposed to provide a torque limiter in the power transmission system so as to permit slippage in the power transmission system when it is subjected to a torque beyond a given level. One of these examples is disclosed in Japanese Utility Model Laid-Open Publication No. HEI-2-112715.

The auger type snow removing machine usually includes an input shaft driven by the prime mover and an auger drive shaft to which drive power is transmitted from the prime mover through a power transmitting mechanism. The torque limiter forming part of the power transmitting mechanism includes a worm wheel located at a central portion of the auger drive shaft. The central portion of the auger drive shaft has an outer periphery treated with sulphurizing or carburizing processes such that when the auger drive shaft is subjected to the overload, the worm wheel tends to rotate in an idling condition relative to the auger drive shaft.

The torque limiter includes the worm wheel and auger drive shaft which are assembled by initially accommodating the worm wheel in a gear case and subsequently press fitting the auger drive shaft to the worm wheel. This assembling method is disadvantageous in that the worm wheel is firmly retained to bear the auger drive shaft that is press fitted to the worm wheel, providing a difficult assembling process. To solve this problem, it has been the usual practice to employ an improved assembling process wherein the worm wheel is initially press fitted to the auger drive shaft to provide a unitary structure and subsequently the unitary structure is placed in the gear case. However, this assembling process requires that the gear case be divided into two halves on a line perpendicular to the auger drive shaft, resulting in a structurally complicated gear case.

Japanese Utility Model Laid-Open Publication No. SHO-58-157029 discloses a clutch mechanism suited for use on a small-sized tiller wherein an engine output shaft is connected to a drive shaft via a clutch. Owing to the clutch mechanism, a clutch housing and the engine are located at a low level near the ground such that the small-sized tiller has a lowered center of gravity. The clutch mechanism also has an overload protection function. That is, the clutch mechanism includes a spring, the force of which is adjusted to a desired value to provide the overload protection function. A technique employing a spring to effect overload protection is disclosed in Japanese Utility Model Post-Exam Publication No. SHO-39-4607 entitled "Tilling Shaft Load Control Device for Tiller" wherein a load control device is employed to prevent tilling craws of the tiller from being ruptured.

In the clutch mechanism of Japanese Utility Model Laid-Open Publication No. SHO-58-157029, the clutch is complicated in structure and hence a torque limiter becomes complicated in structure. Being comprised of the clutch, a clutch release arm and an arm shaft, the clutch mechanism is large in size. Thus, the whole arrangement for accommodating the clutch mechanism is made large sized in lateral direction and has an increased weight, thereby deteriorating maneuverability of the tiller.

SUMMARY OF THE INVENTION

It is therefore a first object of the present invention to provide a power transmission system for a working machine having a torque limiter which is easy to assemble.

Another object of the present invention is to provide a power transmission system for a working machine having a torque limiter which is simple in structure, small in lateral direction and light in weight.

According to an aspect of the present invention, there is provided a power transmission system for a working machine, wherein drive power is transmitted from a prime mover to a work-tool holding drive shaft via a reduction mechanism for driving working members mounted on the drive shaft in its working condition. The reduction mechanism includes an input shaft, a first gear mounted on the input shaft, an output shaft, a second gear mounted on the output shaft and meshing with the first gear, and a gear case for accommodating the first and second gears. The second gear includes a torque limiter composed of a gear portion and a cylindrical boss segment press fitted to the gear portion.

The second gear of the reduction mechanism forms part of the torque limiter wherein the cylindrical boss segment is press fitted to the gear portion and, the reduction mechanism employing the torque limiter is simple in structure, easy to assemble, short in assembling time and low in manufacturing cost. Since the torque limiter has a lateral dimension selected to be in a range corresponding to a press fitting stroke of associated parts, the torque limiter has a reduced size and the reduction mechanism is small in size and light in weight.

In one preferred embodiment, the reduction mechanism forming part of the power transmission system comprises a worm reduction mechanism, wherein the first gear is a worm gear and the second gear is a gear wheel.

At least one of the contact surface of the boss segment and the contact surface of the gear segment may be treated with sulphurizing process such that slipping surfaces are prevented from being worn and the life of the torque limiter is prolonged.

Desirably, the input shaft is rotatably supported by two bearings, one of which is an angular type bearing. For example, in the event that the input shaft includes a bevel gear, the input shaft is subjected to not only a thrust load but also a radial load. With the use of the angular type bearing, both loads are born by the angular type bearing and the number of bearings can be reduced.

It is preferred that one end of the boss segment has an annular flange and the gear segment has an annular recess to receive the annular flange of the boss segment. When the gear segment is moved in a thrust direction relative to the gear segment, the gear segment is prevented from moving an excessive amount by the annular flange of the boss segment. Also, the boss segment can be reliably positioned relative to the gear segment during press fitting of the boss segment to the gear segment by fitting the annular flange of the boss segment to the annular recess of the gear segment and an assembling process of the wheel as a unitary structure can be simplified. For example, in the event that the second gear is a bevel gear, positioning of the associated parts may be simplified during press fitting thereof by fitting the annular flange of the boss segment to the annular recess of the gear segment, thus enabling easy assemblage of the bevel gear into a unitary structure.

BRIEF DESCRIPTION OF THE DRAWINGS

Certain preferred embodiments of the present invention will be described in detail below, byway of example only, with reference to the accompanying drawings, in which.

DETAILED DESCRIPTION OF THE PREFERRED EMBODIMENTS

The following description is merely exemplary in nature and is in no way intended to limit the invention, its application or uses.

Referring now to FIGS. 1 to 4, there is shown a power transmission system for use in a self-propelled working machines such as a snow removing machine.

Figure 1:
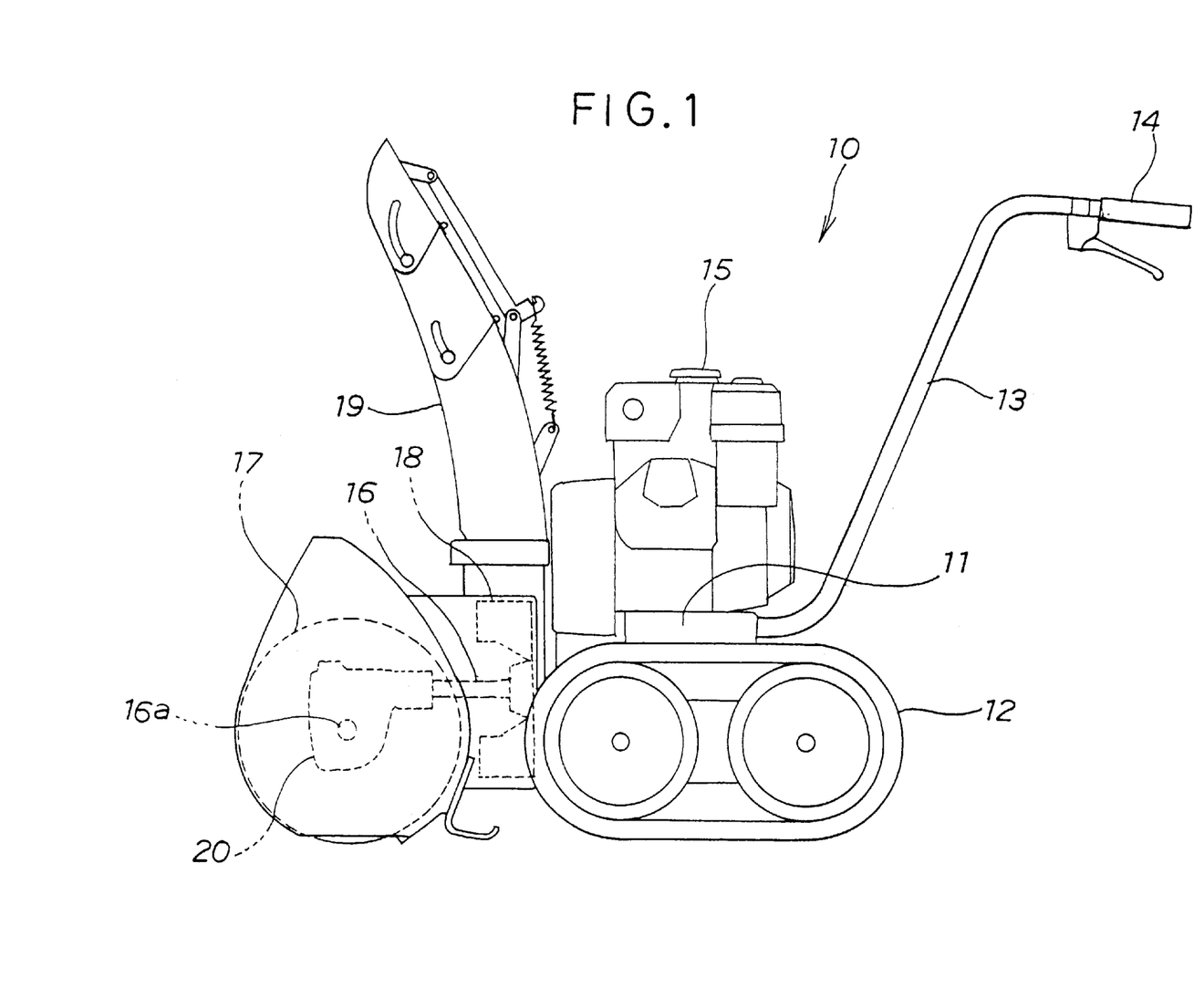
FIG. 1 is a side view of a snow removing machine having a power transmission system according to a first embodiment of the present invention.

In FIG. 1, the snow removing machine 10 includes a body frame 11 having a pair of laterally spaced crawlers 12 (only one shown in FIG. 1) supported by the body frame 11. Handles 13 are connected to a rear portion of the frame body 11 and extend upward and rearward. Extreme upward ends of the handles 13 have respective grip portions 14. A prime mover such as an engine 15 is mounted on the frame body 11 for driving the crawlers 12. The engine 15 has an output drive shaft 16 extending toward a front portion of the frame body 11. The drive shaft 16 is connected to an auger 17 and a snow blower 18 to transmit drive power thereto from the engine 15. The auger 17 collects snow, and collected snow is discharged by the snow blower 18 via a shooter 19. Reference numeral 16a indicates a work-tool holding drive shaft.

An auger transmission unit 20 of a worm type reduction mechanism is coupled through the work-tool holding drive shaft 16 with the engine 15 to form a power transmission system for transmitting drive power from the engine to the auger 17.

Now, the auger transmission unit 20, which forms part of the power transmission system, will be described in detail with reference to FIGS. 2 to 4.

Figure 2:
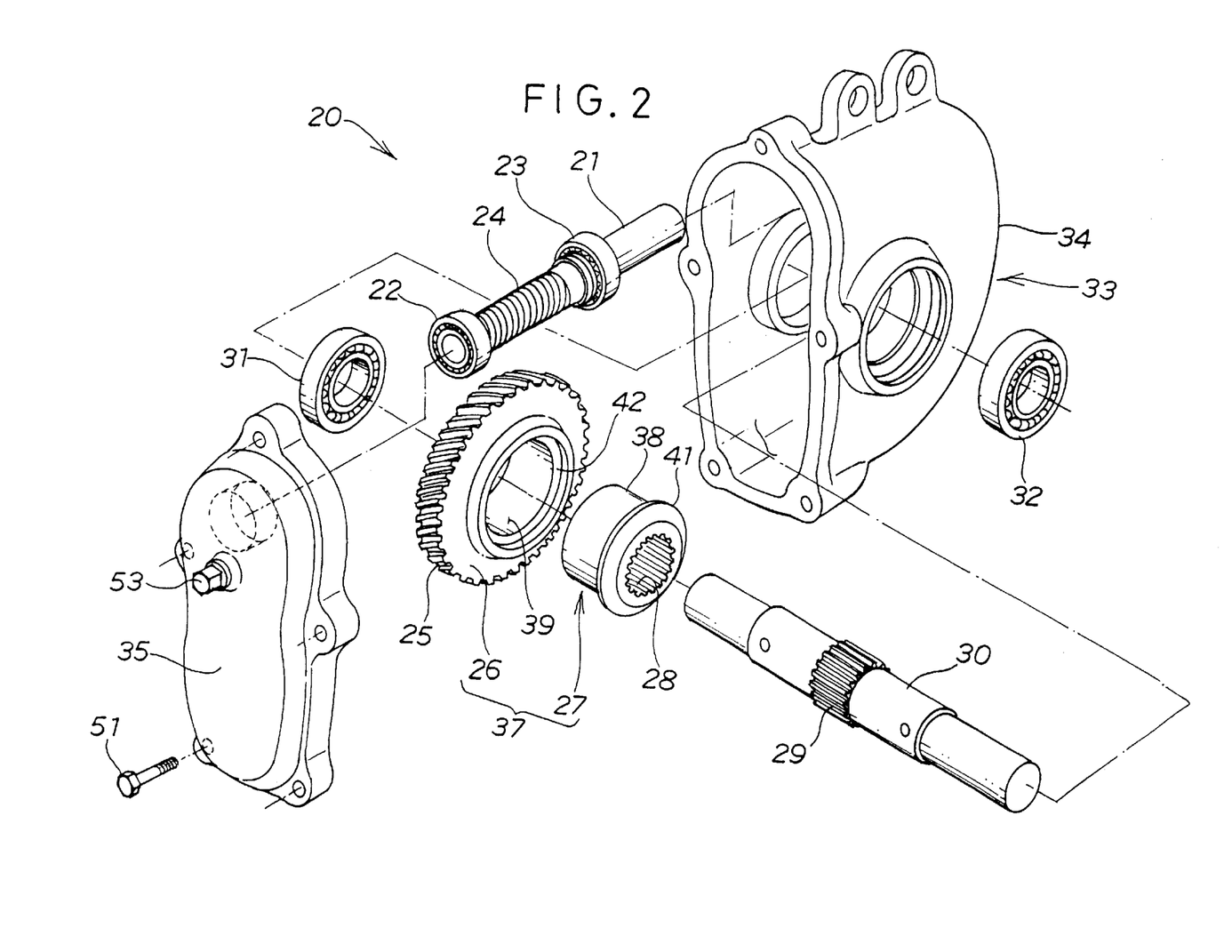
FIG. 2 is an exploded perspective view of the power transmission shown in FIG. 1.

In FIG. 2, the auger transmission unit 20 is shown as a worm type reduction mechanism. The auger transmission unit 20 has a worm shaft 21 that serves as an input shaft. The worm shaft 21 is supported with a pair of bearings 22, 23. A front portion of the worm shaft 21 is formed with a worm gear 24, which serves as a first gear. A disc-shaped gear segment 26 has an outer wheel gear 25 that serves as a second gear meshing with the first gear 24. A cylindrical boss segment 27 is firmly fitted to the gear segment 26 and has an internal female spline 28. An auger drive shaft 30 has an outer male spline 29, that meshes with the female spline 28. The auger drive shaft 30 is rotatably supported with a pair of bearings 31, 32. All the parts discussed above are located in a transmission case 34, and the auger drive shaft 30 is supported by the transmission case 34 by means of the bearings 31, 32. The transmission casing 34 has a front opening, that is closed by a lid 35, thereby forming a gear case 33.

The wheel 37 of the worm type reduction mechanism includes two parts, namely, the cylindrical boss segment 27 and the gear segment 26. The cylindrical boss segment 27 is press fitted to the gear segment 26, such that the gear segment 26 and the cylindrical boss segment 27 rotates in a unitary motion during normal load but freely rotate relative to one another during an overload. That is, the cylindrical boss segment 27 freely rotates relative to the gear segment 26. In this manner, a torque limiter is formed. More particularly, the torque limiter is formed by a cylindrical contact surface 38 and a cylindrical contact surface 39 of the gear segment 26, with both cylindrical contact surfaces being treated with sulphurizing process, which will be described in detail later. One end of the cylindrical boss segment 27 has an annular flange 41. The gear segment 26 has an annular recess 42, on which the annular flange 41 of the cylindrical boss segment 27 is located.

The worm shaft 21 is supported by the bearings 22, 23, with the bearing 23 being composed of an angular type bearing.

The sulphurizing process is one of suitable metal surface treatment processes that disperse free radical sulfur into a surface layer of iron material (such as carbon steel, cast iron, cast steel, stainless steel, etc.). Since the free radical sulfur has a high lubricating property, friction is reduced when mating contact surfaces slip each other, resulting in an increased anti-wear property.

When sulphurizing the surface layer of the metallic parts, a work piece is immersed in a salt bath of a solution of alkali metal salt containing sulfur at the temperature of 190° C. and treated with an anode oxidizing process that forms a dispersed layer of iron sulfide with a thickness of several $\mu$m. In order to form the iron sulfide layer on the contact surface 38 only of the cylindrical boss segment 27, the cylindrical boss segment 27 may be masked (that is, covered with a non-insulation material) at an area except the contact surface. Likewise, the engaging contact surface 42 of the gear segment 26 is formed with the iron sulfide layer in the same manner as discussed above.

Now, the assembling process of the auger transmission 20 will be described in detail with reference to FIG. 3.

Initially, the cylindrical boss segment 27 is press fitted to the gear segment 26, thereby unitarily forming a wheel 37. The press fitting operation may be performed at an arbitrary position different from an assembling site of the auger transmission. Particularly, the gear segment 26 is firstly placed on a work piece support of a press machine (such that the annular recess 42 is oriented upward), the cylindrical boss segment 27 is provisionally set to the gear segment 26 from upward and is forced downward by a press punch. This downward movement is continued until the annular flange 41 is completely received in the annular recess 42 of the gear segment 26. The annular flange 41 prevents the gear from excessively moving in a thrust direction relative to the cylindrical boss segment 27.

Figure 3:
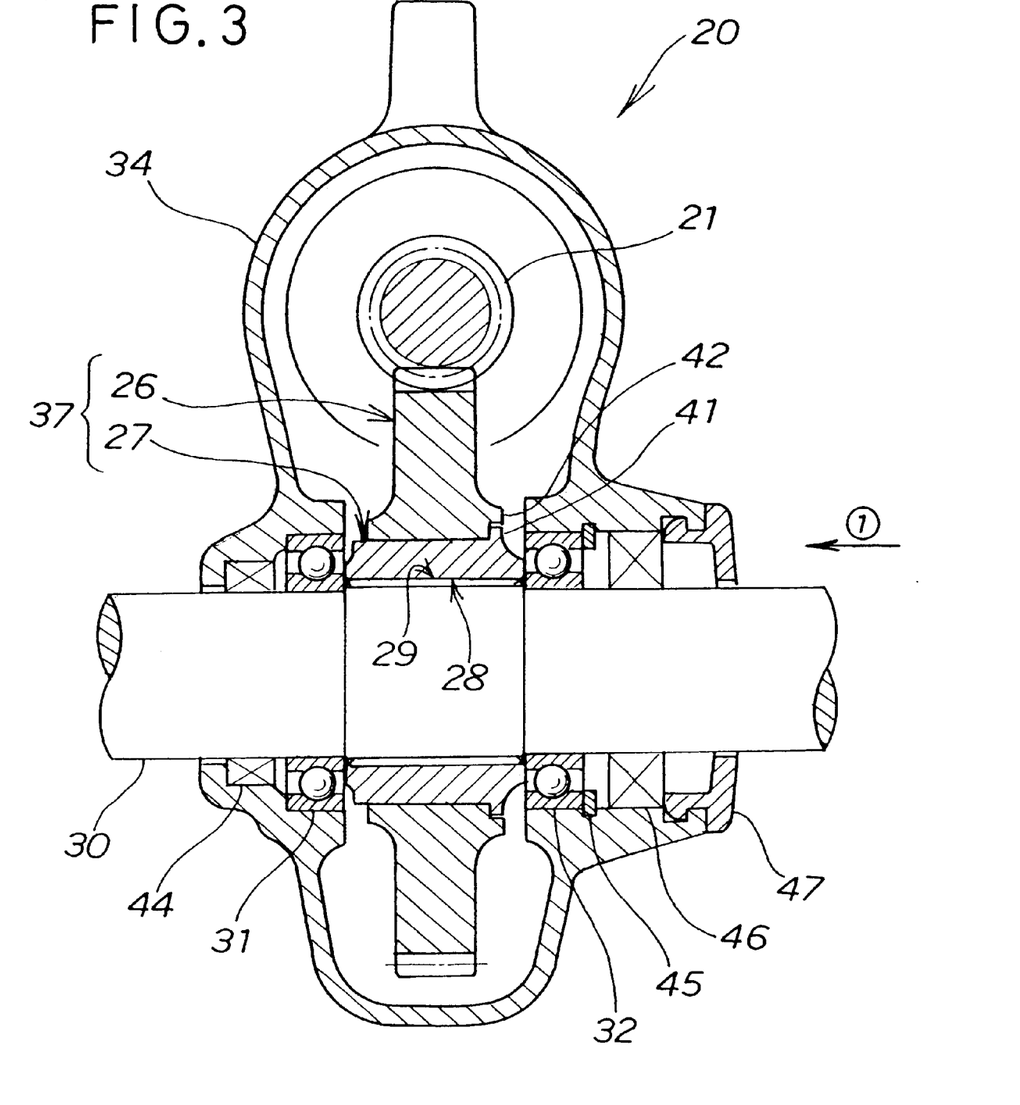
FIG. 3 is a cross-sectional view taken vertically of the power transmission system of FIG. 1.
Figure 4:
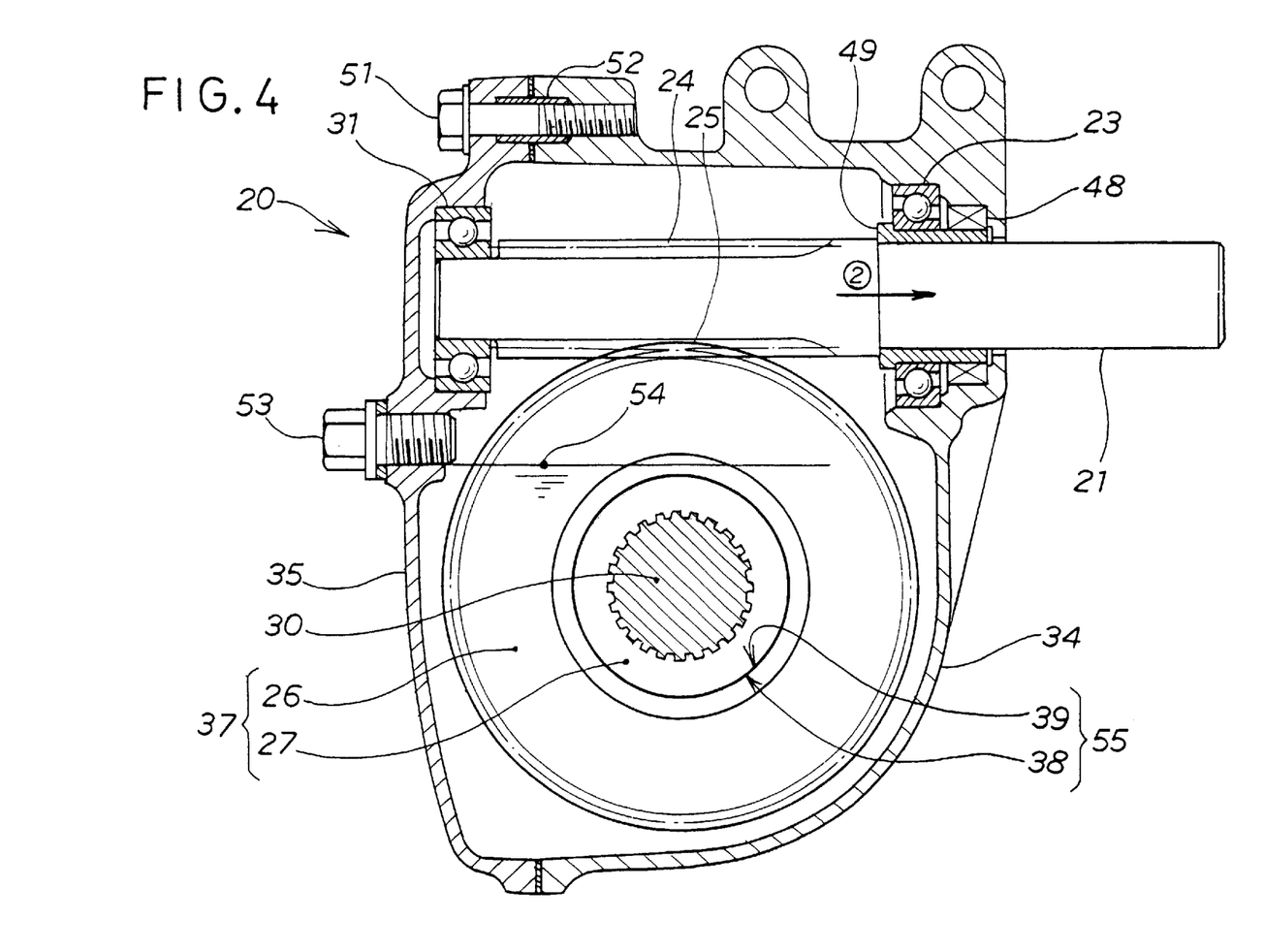
FIG. 4 is a cross-sectional view taken laterally of the power transmission system of FIG. 1.

As best seen from FIG. 3, a bearing 31 and an oil seal 44 are mounted on the transmission case 34 and the worm shaft 21 is assembled to the transmission case 34 in a provisionally assembling state. Subsequently, the wheel 37 is located in the transmission case 34. The auger drive shaft 30 is then transversely inserted through the wheel 37 in a direction as shown by arrow ① in FIG. 3 such that the male spline 29 of the auger drive shaft 30 meshes with the female spline 28 of the cylindrical boss segment 27. Finally, a bearing 32, a retaining ring (C-shaped ring) 45, an oil seal 46 and a cover cap 47 are mounted to the transmission case 34 in a sequential order. Although one example of the assembling sequence has been described above, essential parts of the auger transmission 20 can be easily assembled in a manner as discussed above.

A support structure of the worm shaft 21 will now be described in detail with reference to FIG. 4.

Initially, an oil seal 48 and the angular type bearing 23 are mounted in the transmission case 34, and the worm shaft 21 carrying the sleeve 49 are inserted into the angular type bearing and the oil seal 48 in a direction as shown by arrow ②. In an alternative way, the sleeve 49, the oil seal 48 and the angular type bearing 23 are provisionally mounted on the worm shaft 21 and, subsequently, these parts are assembled in the transmission case 34. The assembled condition of these parts corresponds to the provisionally assembled state of the worm shaft 21 shown in FIG. 3.

In a final stage of assembling, the bearing 31 is fitted to the lid 35 and a distal end of the worm shaft 21 is fitted to the bearing 31. Thereafter, the lid 35 is mated with the transmission case 34 and these parts are connected with each other by a plurality of bolts 51. Thus, the assembling of the auger transmission 20 is completed.

When assembling the auger transmission 20, the lid 35 is precisely positioned relative to the transmission case 34 by at least two positioning members 52. Lubricating oil 54 is filled into the transmission case 34 through an oil-level monitoring hole of the lid 35 and, subsequently, the oil-level monitoring hole is closed with a bolt-shaped plug 53.

Operation of the auger transmission 20 thus assembled will now be described in detail with reference to FIG. 4.

When the worm shaft 21 that serves as the input shaft is rotated by the prime mover, the worm gear 24 meshing with the wheel gear 25 rotates the wheel 37 and the auger drive shaft 30 rotates. When this occurs, the worm shaft 21 is subjected to a thrust force (thrust load) due to reaction force in the direction ②. The angular type bearing 23 bears the thrust force. If a usual radial bearing is employed, an additional thrust bearing should be provided with a view to bearing the thrust force. Since, however, the angular type bearing 23 bears both the radial load and the thrust load, the number of bearings may be decreased in accordance with the present invention.

A torque limiter 55 is formed by a boundary between the cylindrical boss 27 and the gear 26 (namely, the contact surfaces 38, 39).

In the event that the auger drive shaft 30 is subjected to an excessive torque beyond a rating torque when the auger bites foreign matters, the slippage is caused in the torque limiter 55 indicated by a solid circle line. Namely, the gear segment 26 is caused to rotate in an idling condition relative to the cylindrical boss segment 27. Consequently, the auger transmission 20 is prevented from being mechanically damaged that may occur in a power transmission line.

As already discussed above, since the contact surfaces 38 and 39 of the torque limiter 55 are treated with the suphurizing process, the friction forces acting on the contact surfaces 38 and 39 during the slippage can be reduced and life of the auger transmission 20 can be extended for a sufficiently longer time.

Since, also, the torque limiter 55 is immersed in the lubricating oil 54, the friction heat caused by slippage of the contact surfaces 38 and 39 is absorbed with the lubricating oil 54. Thus, it is possible to prevent an increase in the temperature of the contact surfaces 38 and 39 (that is, the slipping surfaces) and the life of the wheel 37 can be extremely extended.

A second preferred embodiment of a power transmission system for the working machine according to the present invention will now be described with reference to FIGS. 5 to 10. In the second preferred embodiment, the working machine is shown as an example of a power tiller.

Figure 5:
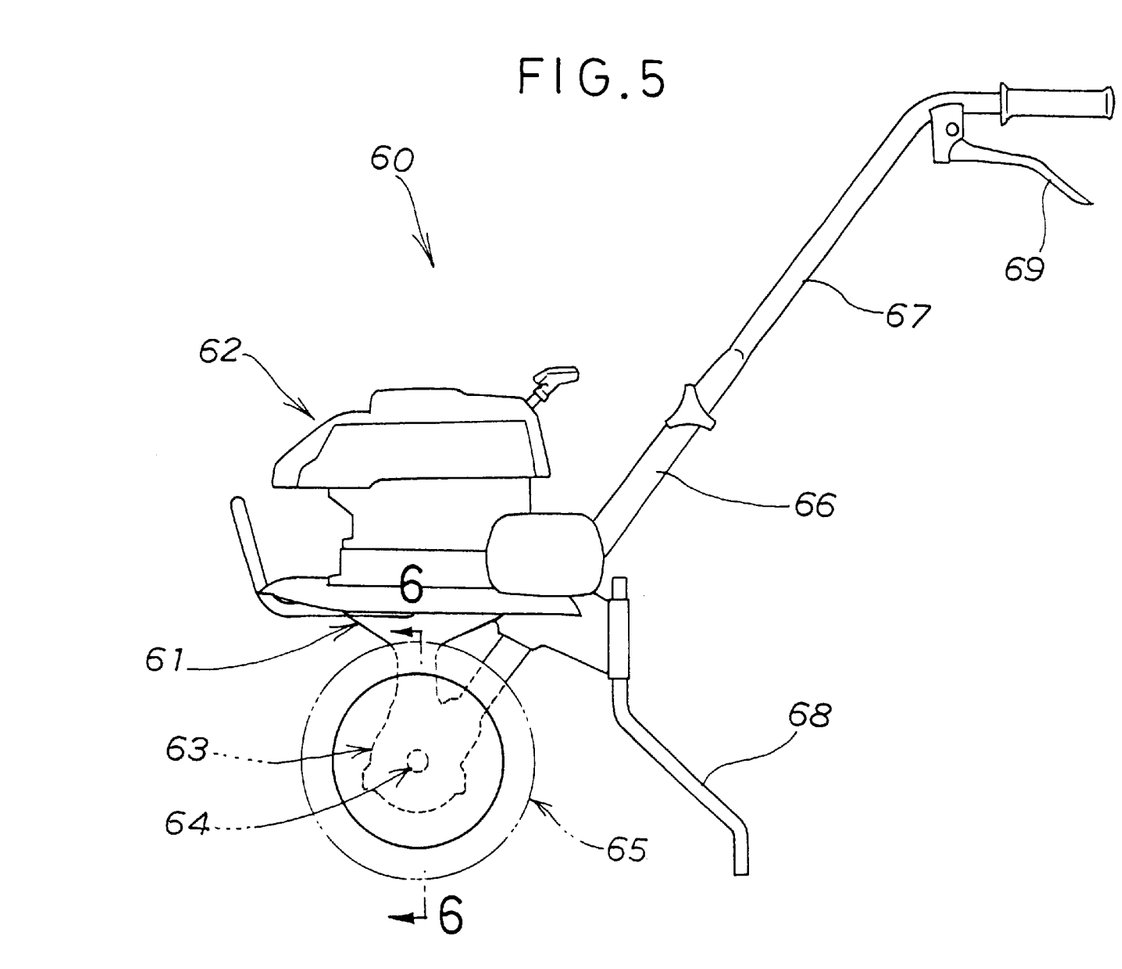
FIG. 5 is a side elevational view of a power tiller having a power transmission system according to a second embodiment of the present invention.

In FIG. 5, the power tiller 60 includes a frame body 61 mounting thereon a prime mover such as an engine 62, a power transmission system mounted on the frame body 61 at a position below the engine 62 and including a reduction mechanism 63, a craw drive shaft 64 connected to the reduction mechanism 63, a plurality of tilling craws mounted on the craw drive shaft 64, a handle post 66 extending upward and rearward from a rear portion of the reduction mechanism 63, and a handle 67 connected to an upper end of the handle post 66. The power tiller 60 will be referred to as an ambulatory type self-propelled tiller that is a compromise between a self-propelled tiller which is propelled by an output of the engine 62 serving as the prime mover, and an ambulatory type tiller operated by person. A resistance bar 68 is connected to a rear part of the frame body 61. A clutch lever 69 is supported at an upper end portion of the handle 67.

Figure 6:
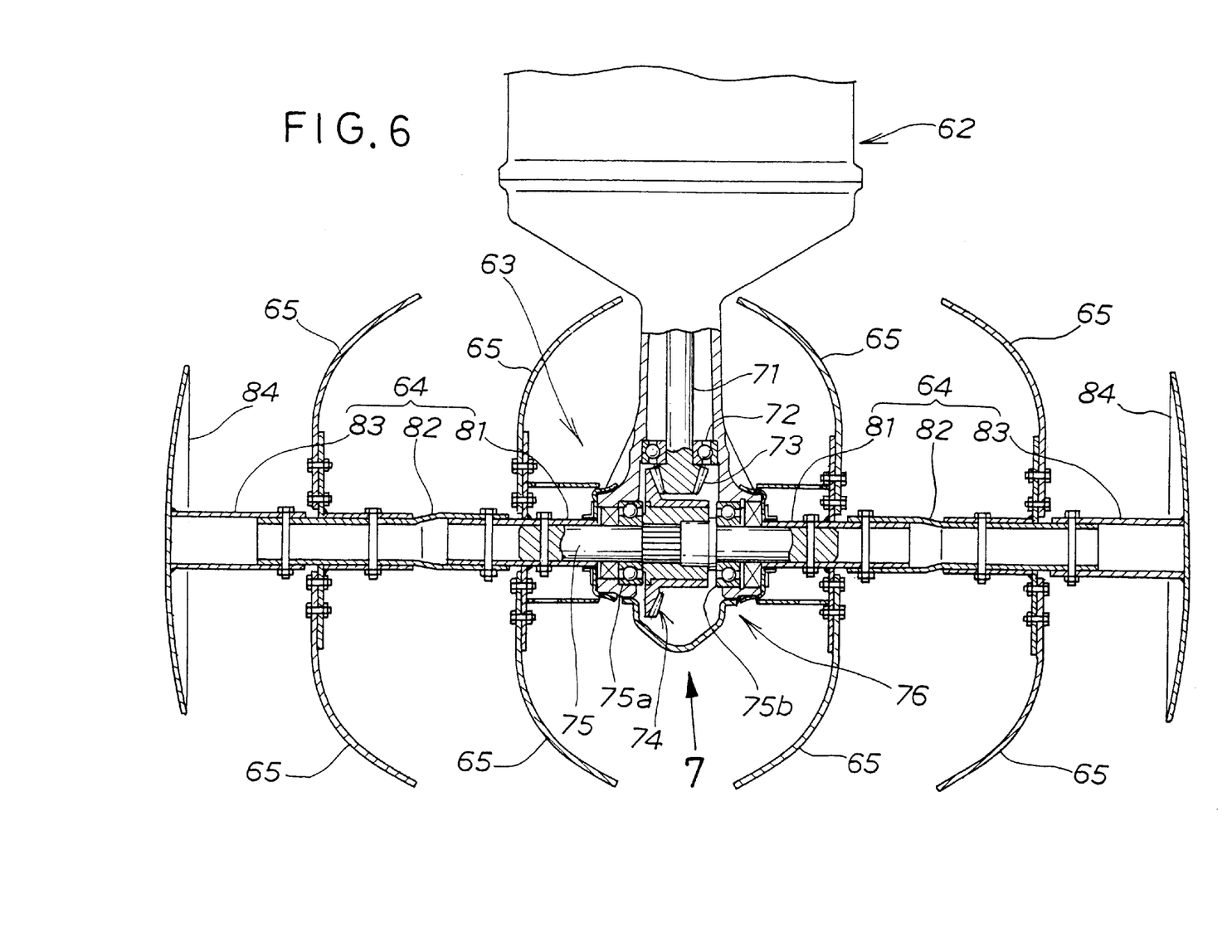
FIG. 6 is an enlarged cross-section taken along line 6—6 of FIG. 5.
Figure 7:
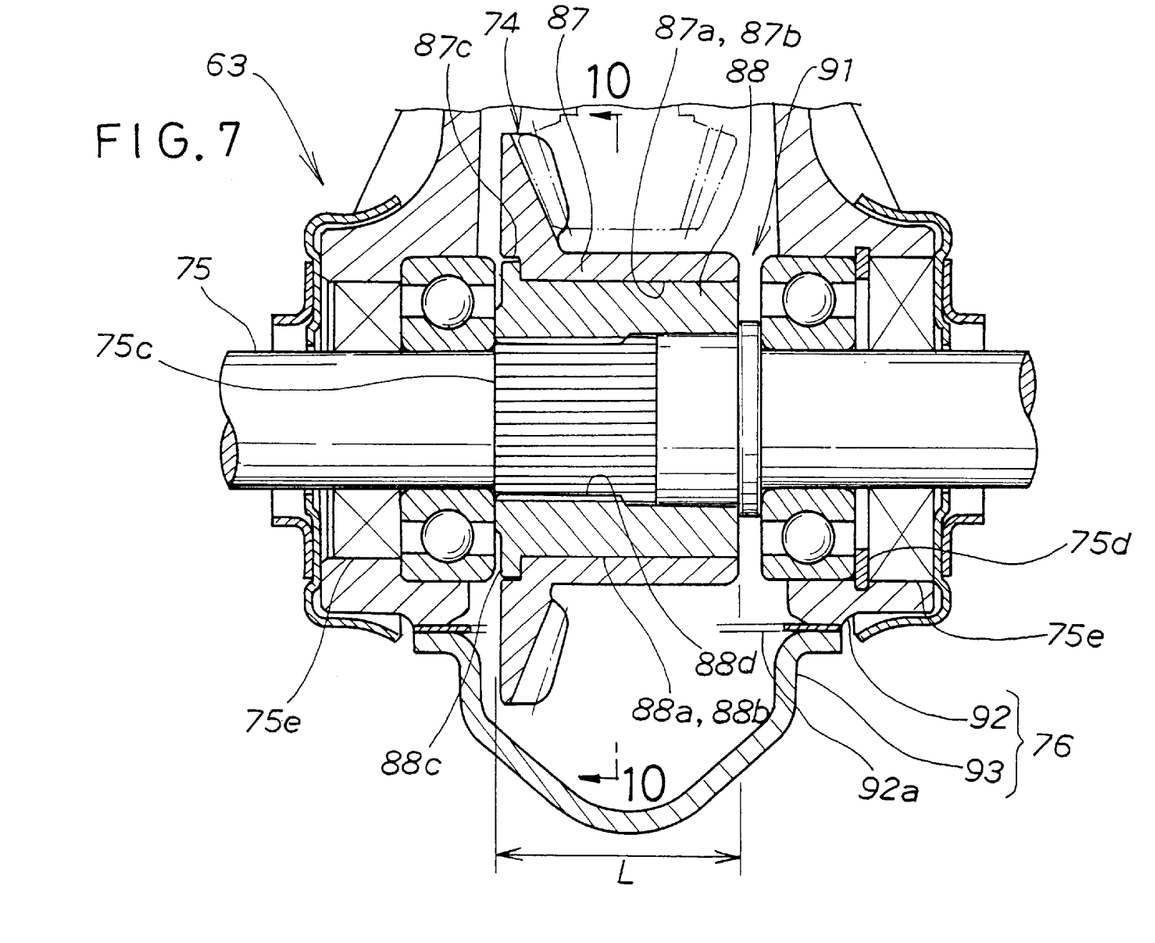
FIG. 7 is an enlarged cross-sectional view of a part shown by arrow 7 of FIG. 6.

FIGS. 6 and 7 show the reduction mechanism 63 and the tilling craws 65 in cross section.

In FIG. 6, the reduction mechanism 63 includes an input shaft 71 extending downward from an output side of the engine 62, a bearing 72 rotatably supporting a lower end portion of the input shaft 71, a first bevel gear 73 that is formed at a lower distal end of the input shaft 71, a second bevel gear 74 meshing with the first bevel gear 73 and having a diameter larger than that of the first bevel gear 73, an output shaft 75 mounting thereon the second bevel gear 74, a pair of bearings 75a, 75b that rotatably support the output shaft 75, and a gear case 76 that accommodates all the parts discussed above. The bearing 72 is an angular type bearing, and the bearing 75a is also an angular type bearing.

The craw drive shaft 64 includes a pair of first shafts 81,81 connected to both ends of the output shaft 75, respectively, a pair of second shafts 82,82 connected to the first shafts 81,81 respectively, and a pair of third shafts 83,83 connected to the second shafts 82,82, respectively. Side discs 84 are coupled to respective ends of the third shafts 83, 83, respectively.

FIG. 7 illustrates an enlarged cross sectional view of a section 7 of FIG. 6, related to the reduction mechanism 63.

In FIG. 7, the second bevel gear 74 includes a torque limiter 91 that includes an outer gear segment 87 and an inner cylindrical boss segment 88. The inner cylindrical boss segment 88 is press fitted to the outer gear portion 87.

The torque limiter 91 is formed by press fitting the inner cylindrical boss segment 88 to the outer gear segment 87 under a predetermined press force such that, when a rating torque is transmitted through the torque limiter 91, the outer gear segment 87 and the inner cylindrical boss segment 88 rotates in unitary motion and, when the torque limiter 91 is subjected to an over-loaded condition, that is, when an excessive torque is applied to the torque limiter 91, drive connection is released between the outer gear segment 87 and the inner cylindrical boss segment 88 and the outer gear segment 87 rotates in an idling condition relative to the inner cylindrical boss segment 88. The torque limiter 91 has a lateral dimension L.

The outer gear segment 87 has an inner bore 87a, which has an inner peripheral surface forming a contact surface 87b. An annular recess 87c is formed at one end of the outer gear portion 87.

The boss segment 88 has a shaft portion 88a and an annular flange 88c formed at a distal end of the shaft portion 88a. The shaft portion 88a has an outer cylindrical periphery that forms a contact surface 88b. The boss segment 88 has an inner bore formed with a female spline 88d.

The output shaft 75 has a male spline 75c, which meshes with the female spline 88d of the boss segment 88 to provide a drive connection.

The gear case 76 includes a transmission case 92 and a lid 93 that closes a lower opening of the transmission case 92.

Reference numerals 75d and 75e, 75e indicate a retaining ring and oil seals, respectively. A reference numeral 92a indicates a packing located between the transmission case 92 and the lid 93.

Figure 8:
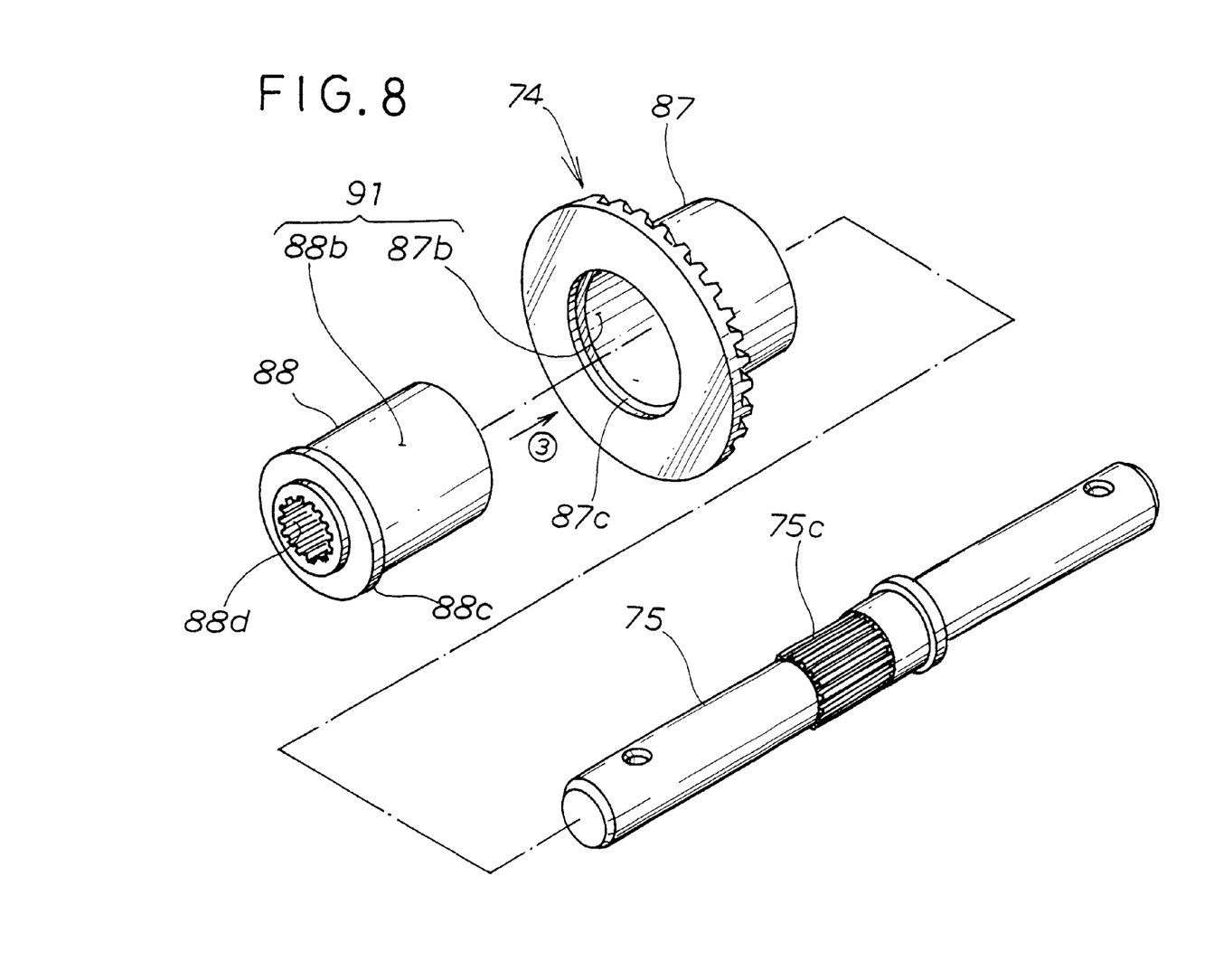
FIG. 8 is an exploded perspective view of a torque limiter according to the present invention.

FIG. 8 illustrates an exploded perspective view of the torque limiter according to the present invention. The torque limiter 91 is formed by the contact surface 88b formed on the gear portion 87 of the second bevel gear 74, and the contact surface 88b formed on the outer periphery of the boss segment 88. At least one of the contact surface 88b of the boss segment 88 and the contact surface 87b of the gear segment 87 may be preferably treated with the sulphurizing process. When assembling the gear segment 87 and the boss segment 88, the boss segment 88 is press fitted to the gear segment 87 in a direction as shown by arrow ③ until the annular flange 88c is fitted to the annular recess 87c.

Now, the operation of the second preferred embodiment of the power transmission system according to the present invention will be described with reference to FIGS. 9A to 10.

Figure 9A:
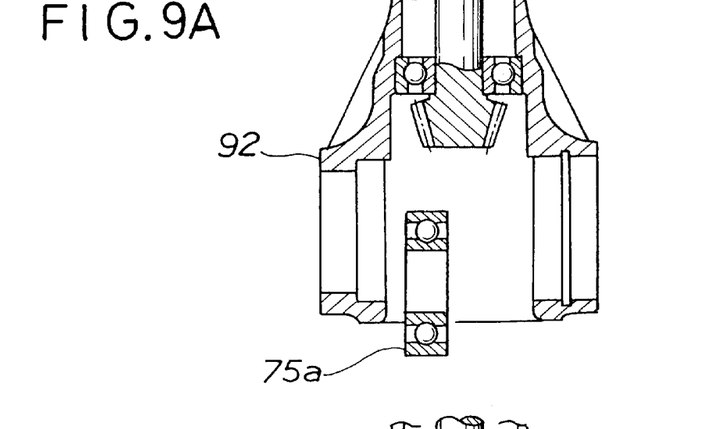
FIGS. 9A to 9C are views illustrative of the general sequence of assemblage of the reduction mechanism according to the second embodiment of the present invention.
Figure 9B:
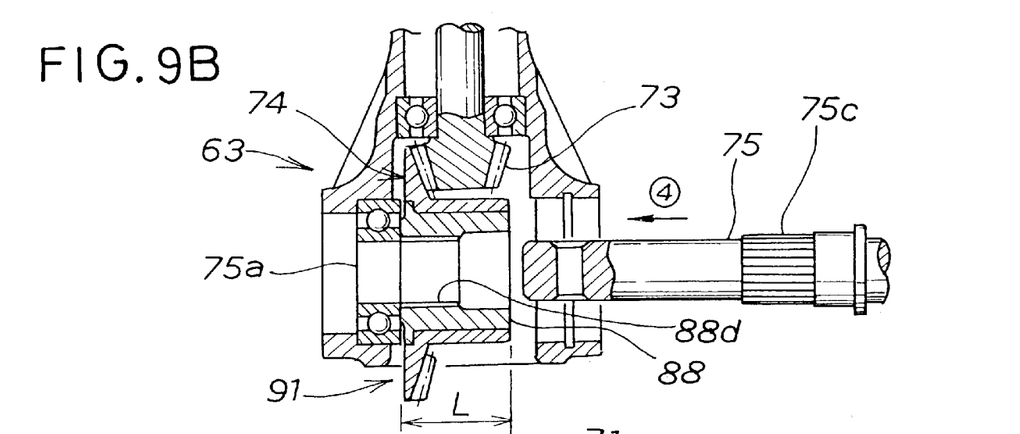
Figure 9C:
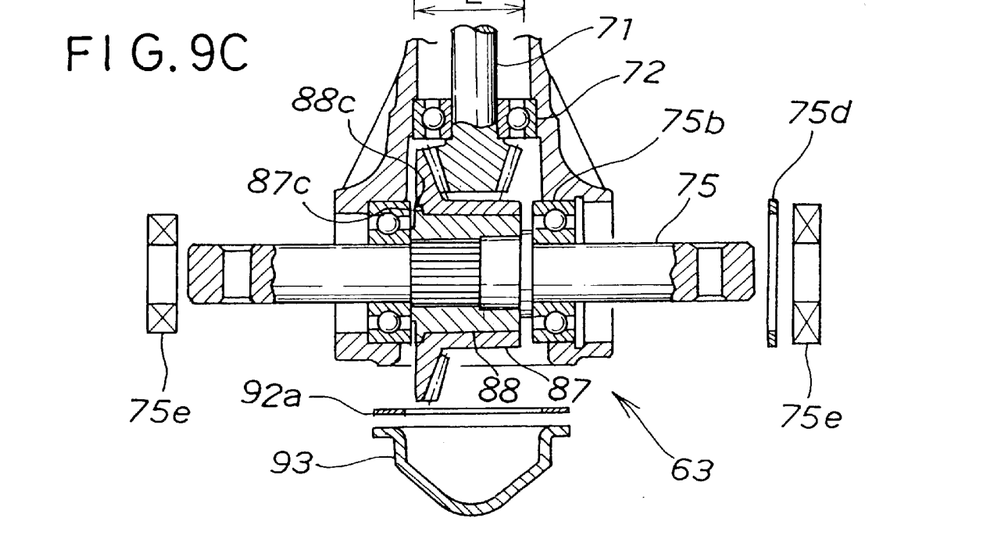

FIGS. 9A to 9C show a general sequence of assembling the reduction mechanism.

FIG. 9A: Initially, fixing the bearing 75a to the transmission case 92.

FIG. 9B: Next, meshing the second bevel gear 74 that is preliminarily assembled with the first bevel gear 73, moving the output shaft 75 in a direction as shown by arrow ④ such that the male spline 75c of the output shaft 75 engages with the female spline 88d of the boss segment 88.

FIG. 9C: In a succeeding step, mounting the bearing 75b on the output shaft 75, fitting the retaining ring 75d in the transmission case 92 and mounting the oil seals 75e, 75e to the transmission case 92 from the right and left sides thereof. Finally, the packing 92a and the lid 93 are secured to the transmission case 92 to close the opening thereof and lubricating oil is poured into the transmission case 92 from an oil supply port (not shown). It will thus be understood that, in accordance with the present invention, essential parts of the reduction mechanism 63 can be assembled in an easy fashion.

Since the torque limiter has the annular recess 87c and the annular flange 88c, the annular flange 88c can be easily positioned in a fixed place by locating the annular flange 88c in the annular recess 87c and the assembling process can be simplified.

Further, the annular flange 88c prevents the gear segment 87 from moving in a thrust direction (parallel to the axis of the output shaft 75) for an excessive amount.

Since the bearing 72 of the input shaft 71 is the angular type bearing, the angular type bearing 72 can bear the radial load and the thrust load acting on the input shaft 71 and, therefore, the number of bearings are minimized.

As shown in FIG. 9B, the torque limiter 91 is located within the lateral distance L and the lateral dimension of the torque limiter 91 is defined to have a value corresponding to a stroke of the boss segment 88 which is press fitted. Consequently, the torque limiter 91 does not have a laterally, excessively projected portion and the lateral size of the torque limiter 91 can be minimized. Accordingly, the reduction mechanism 63 may have a minimized size.

Figure 10:
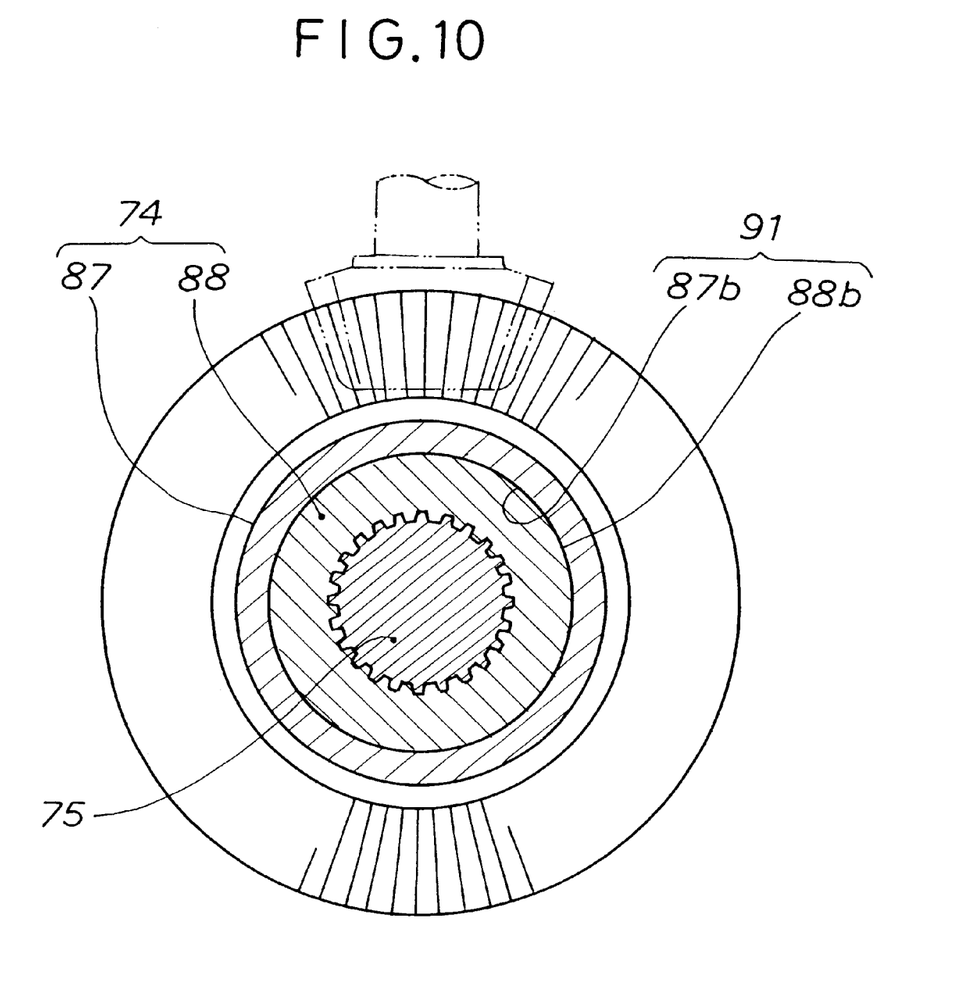
FIG. 10 is an enlarged cross-sectional view of the reduction mechanism according to the second embodiment of the present invention.

As shown in FIG. 10, since the torque limiter 91 is formed by a boundary between the gear segment 87 and the boss segment 88 (that is, between the contact surfaces 87b, 88b), the torque limiter 91 has a simplified structure.

It will now be understood that since the torque limiter 91 is composed of the contact surface 87b formed on gear segment 87 of the second bevel gear 74 and the contact surface 88b formed on the boss segment 88, the essential parts of the torque limiter 91 are commonly used as the second bevel gear 74 and the torque limiter 91 has a reduced weight.

In the event that the output shaft 75 is subjected to an excessive load greater than the rated torque, that is, when the tilling craws incidentally bite foreign matters such as stones or wood pieces, slippage occurs in the torque limiter 91. That is, the gear segment 87 rotates in an idling condition relative to the boss segment 88. As a result, there is no serious damages applied to the power transmission system and, also, the tilling craws are prevented from being ruptured.

As already noted above, at least one of the contact surfaces 87b, 88b are treated with the sulphurizing process. Accordingly, even when slippage occurs between the contact surfaces 87b, 88b, the associated parts of the torque limiter 91 can be prevented from undesirable wear and the life of the second bevel gear 74 can be extended for sufficiently prolonged time period.

The prime mover may include an electric motor. The angular type bearing may be either an angular type ball bearing or an angular type needle bearing.

In addition, a connecting structure between the auger drive shaft and the boss segment may be a spline connection or key connection.

The working machine of the present invention is not limited to the snow removing machine or the power tiller 60 and may be applied to an agricultural machine such as a rice-planting machine or a transplantation machine, or an industrial machine.

The torque limiter of the power transmission system is not limited to the gear 25 and the bevel gear 74.

Obviously, various minor changes and modifications of the present invention are possible in the light of the above teaching. It is therefore to be understood that within the scope of the appended claims the invention may be practiced otherwise than as specifically described.

What is claimed is:

1. A power transmission system for a working machine wherein drive power is transmitted from a prime mover to a work-tool holding drive shaft via a reduction mechanism for driving a work tool mounted on the work-tool holding drive shaft in a working condition thereof, the reduction mechanism comprising:
    an input shaft;
    a first gear mounted on the input shaft;
    an output shaft;
    a second gear mounted on the output shaft and meshing with the first gear; and
    a gear case for accommodating the first and second gears;
    wherein the second gear has a torque limiter comprising a gear portion and a cylindrical boss press fitted to the gear portion, the boss having at one end an annular flange and the gear portion having an annular recess to accommodate the annular flange.

2. A power transmission system according to claim 1, wherein the reduction mechanism is a worm type reduction mechanism, the first gear is a worm gear, and the second gear is a wheel.

3. A power transmission system according to claim 1, wherein the boss segment and the gear portion, which form the torque limiter, have respective contact surfaces, at least one of which is treated with sulphurizing process.

4. A power transmission system according to claim 1, further comprising bearings for rotatably supporting the input shaft, at least one of which is an angular type bearing.

5. A power transmission system according to claim 1; wherein the boss has a central opening provided with an internal spline, and the output shaft extends through the central opening of the boss and has an external spline for engaging with the internal spline of the boss so that the boss and the output shaft undergo rotation together.

6. A power transmission system according to claim 1; wherein the output shaft comprises the work-tool holding drive shaft.

7. A power transmission system according to claim 1; wherein the work tool comprises a snow removal mechanism having an auger and a blower driven by the output shaft.

8. A power transmission system according to claim 1; wherein the work tool comprises a power tiller driven by the output shaft.

9. A power transmission system according to claim 1; wherein press-fit surfaces of the gear portion and the boss are cylindrical press-fit surfaces.

10. A power transmission system according to claim 9; wherein at least one of the press-fit surfaces is exposed to a sulphurizing process conducted in an alkali metal salt bath containing sulfur.

11. A power transmission system according to claim 9; wherein the salt bath is maintained at a temperature of 190° C.

12. A transmission mechanism for an internal combustion engine for transmitting rotation of an output shaft of the engine to rotation of a driven mechanism, comprising:
    an input shaft having a worm gear provided thereon for undergoing rotation with the output shaft of the engine; a gear wheel in meshing engagement with the worm gear and comprised of a gear portion having a central opening therethrough and a boss press fitted to a peripheral mating surface of the central opening; and an output shaft extending through an opening formed in the boss to undergo rotation therewith to drive the driven mechanism; wherein the boss undergoes rotation independent of the gear portion in response to an excessive torque caused by a reversed input from the driven mechanism, at least one of a press-fit surface of the gear portion and a press-fit surface of the boss portion is subjected to a sulphurizing process, and a boss has an annular flange at one end and the gear portion has an annular recess to accommodate the annular flange.

13. A transmission mechanism according to claim 12; wherein the output shaft is a shaft of the driven mechanism.

14. A transmission mechanism according to claim 12; wherein the driven mechanism is a snowplow mechanism having an auger and a blower driven by the output shaft.

15. A transmission mechanism according to claim 12; wherein the driven mechanism is a tiller.

16. A transmission mechanism according to claim 12; wherein the sulphurizing process is conducted in an alkali metal salt bath containing sulfur.

17. A transmission mechanism according to claim 16; wherein the salt bath is maintained at a temperature of 190° C.

18. A transmission mechanism according to claim 12; wherein press-fit surfaces of the gear portion and the boss portion are cylindrical press-fit surfaces.

19. A transmission mechanism according to claim 12; further comprising bearings for rotatably supporting the input shaft and the output shaft, at least one of the bearings being an angular type bearing.

* * * * *